(12) United States Patent
Bodin et al.

(10) Patent No.: US 10,617,499 B1
(45) Date of Patent: Apr. 14, 2020

(54) METHOD OF INJECTING A CLEANING AGENT AND ASSOCIATED ORAL CARE APPLIANCE

(71) Applicant: Willo 32 SAS, Limoges (FR)

(72) Inventors: Antoine Michel Jean Bodin, Limoges (FR); Alexandre Georges Gabriel Laurent, Brooklyn, NY (US)

(73) Assignee: Willo 32 SAS, Limoges (FR)

( * ) Notice: Subject to any disclaimer, the term of this patent is extended or adjusted under 35 U.S.C. 154(b) by 0 days.

(21) Appl. No.: 16/270,292

(22) Filed: Feb. 7, 2019

(51) Int. Cl.
| A61C 17/02 | (2006.01) |
| A61C 3/025 | (2006.01) |
| A61C 17/022 | (2006.01) |
| A46B 11/06 | (2006.01) |
| A46B 9/04 | (2006.01) |

(52) U.S. Cl.
CPC .......... *A61C 17/0211* (2013.01); *A46B 9/045* (2013.01); *A46B 11/063* (2013.01); *A61C 3/025* (2013.01); *A61C 17/022* (2013.01); *A46B 2200/1066* (2013.01)

(58) Field of Classification Search
None
See application file for complete search history.

(56) References Cited

U.S. PATENT DOCUMENTS

| 5,104,315 A * | 4/1992 | McKinley .......... A61C 17/0211 433/216 |
| 7,082,638 B2 | 8/2006 | Koh |
| 7,537,451 B1 | 5/2009 | Ramnarine |
| 8,448,282 B2 | 5/2013 | Stapelbroek |
| 8,617,090 B2 | 12/2013 | Fougere |
| 8,635,731 B2 | 1/2014 | Garner |
| 8,667,634 B2 | 3/2014 | Steur |
| 8,745,802 B2 | 6/2014 | Steur |
| 8,863,346 B2 | 10/2014 | Headstrom |
| 8,978,189 B1 | 3/2015 | Sexton |
| 8,990,992 B2 | 3/2015 | Stapelbroek |
| 9,084,655 B2 | 7/2015 | Sahoo |
| 9,277,980 B2 | 3/2016 | Leveling |
| 9,308,065 B2 | 4/2016 | Steiner |
| 9,504,542 B2 | 11/2016 | De Gentile |
| 9,526,597 B2 | 12/2016 | Steur |
| 9,636,195 B2 | 5/2017 | Wolpo |
| 9,636,197 B2 | 5/2017 | Khangura |
| 9,668,840 B2 | 6/2017 | Miller |
| 9,907,633 B2 | 3/2018 | Wolpo |
| 2007/0184404 A1 | 8/2007 | Johnki |
| 2015/0024340 A1 * | 1/2015 | De Gentile ........ A61C 17/0211 433/82 |
| 2015/0328084 A1 * | 11/2015 | Cash ..................... A61J 7/0053 604/79 |

(Continued)

FOREIGN PATENT DOCUMENTS

| EP | 2654609 B1 | 3/2018 |
| EP | 2654611 B1 | 4/2018 |

(Continued)

*Primary Examiner* — Nicole Blan
(74) *Attorney, Agent, or Firm* — Daylight Law, P.C.

(57) ABSTRACT

An oral care appliance in which a cleaning agent is injected from a supply tank and a method for use of such an appliance in oral care for the teeth of one or two arches using a mouthpiece is disclosed herein.

21 Claims, 7 Drawing Sheets

(56) References Cited

U.S. PATENT DOCUMENTS

| | | | |
|---|---|---|---|
| 2016/0107179 A1* | 4/2016 | McAndrew | B05B 9/002 |
| | | | 239/13 |
| 2016/0113745 A1 | 4/2016 | Golub | |
| 2016/0135581 A1 | 5/2016 | Pai | |
| 2016/0206415 A1 | 7/2016 | Kraft | |
| 2016/0270892 A1 | 9/2016 | Yoo | |
| 2017/0367801 A1 | 12/2017 | Fitzgerald | |
| 2018/0000573 A1 | 1/2018 | Miller | |
| 2018/0184795 A1 | 7/2018 | Pai | |
| 2018/0184857 A1 | 7/2018 | Pai | |

FOREIGN PATENT DOCUMENTS

| | | |
|---|---|---|
| WO | 2017061980 A1 | 4/2017 |
| WO | 2017146366 A1 | 8/2017 |
| WO | 2018160986 A1 | 9/2018 |

\* cited by examiner

METHOD OF INJECTING A CLEANING AGENT AND ASSOCIATED ORAL CARE APPLIANCE

BACKGROUND OF THE INVENTION

Dental cleaning plays a significant role in impacting the overall health of an individual. Many people schedule frequent visits to a dentist for regular check-up and cleaning operations. Many devices have been developed over the years to achieve the purpose of oral hygiene. These devices are either electrical or non-electrical. Among the above-mentioned categories of dental cleaning devices, electric dental units have gained popularity. Some examples of electric dental units are electric toothbrushes, water picks and electric flosses which intend to provide cleaning results by eradicating the food remains, plaque, etc. from the spaces in between the teeth. These devices tend to require less user intervention in their operation and some are also suitable for people with reduced mobility or people on the move for whom it is difficult to use a traditional toothbrush. However, it is necessary to provide and improve existing dental units for ensuring satisfactory cleaning results.

In order for existing devices to be effective, a high level of consumer compliance with techniques and/or instructions for using the electrical dental cleaning devices is required. Also, the user is required to manipulate the device on various regions of the oral cavity for performing the cleaning action. Additionally, during the usage process of certain existing devices which deploy oral care liquid directly to an area proximate to the teeth, the oral care liquid may be spilled outside the teeth area and may provide the user with an obnoxious taste.

One drawback of existing oral care appliances is the limited efficiency and durability of their electrical components which reduces the appliance's useful life. The components of the dental cleaning units may suffer degradation due to their contact with fluid or waste. There may also be some moving parts in the dental units which require maintenance. As such, the overall maintenance cost of the electrical dental units can be increased due to degradation of these components.

SUMMARY OF THE INVENTION

Specific embodiments of the present invention disclosed herein relate to an oral care appliance and a method for injecting a cleaning agent or a cleaning agent composition. In particular, specific embodiments of the present invention disclosed herein relate to an oral care appliance for dental cleaning.

Specific embodiments of the present invention provide a solution to overcome one or more of the above-mentioned problems with an oral care appliance. Moreover, specific embodiments of the present invention provide an easy to maintain and convenient oral care appliance.

Specific embodiments of the present invention allow for a reduction in the time dedicated to oral hygiene and to brushing to a few seconds and significantly increases its efficiency. The invention also allows a better flow of the cleaning agent or the fluid in an oral care appliance.

An appliance and a method of injecting a cleaning agent, for use in oral care, are disclosed for maintaining oral health and hygiene. The oral care appliance may be utilized for cleaning, whitening and in other general oral care applications.

Specific embodiments of the present invention include an oral care appliance comprising a mouthpiece configured to form a cavity when applied on a dental arch of a user and a connection assembly to supply a cleaning agent to the mouthpiece from at least one supply tank. The cavity can be a closed or nearly closed space between the mouthpiece and the dental arch of a user. For example, the cavity can be formed between the mouthpiece and gums of the user when the mouthpiece is applied on a dental arch of the user.

In specific embodiments of the invention, the oral care appliance can conduct an "injection" in which the cleaning agent is first received into a connection assembly from a supply tank and is subsequently injected into a mouthpiece. The cleaning agent can be received into the connection assembly from the at least one supply tank due to pressure difference between the mouthpiece and the at least one supply tank. The appliance also includes a propellant system configured to propel the cleaning agent through the connection assembly, thereby resulting in injection of the cleaning agent into the mouthpiece.

In specific embodiments of the present invention, the connection assembly comprises at least one pipe and a first valve mechanism. The pipe can be a hard shelled or flexible tube. The pipe can be detachable from the mouthpiece and supply tank for cleaning. In specific embodiments of the invention, the pipe can be detached at the first valve mechanism and can include sockets configured to mate with the mouthpiece and first valve mechanism.

In specific embodiments of the present invention an oral care appliance is provided wherein a calibrated volume of the connection assembly calibrates the amount of cleaning agent injected into a mouthpiece in a single injection. For example, a calibrated inner volume of the at least one pipe, or any portion of the connection assembly, can be used to calibrate the amount of the cleaning agent being injected into the mouthpiece. The inner volume can be calibrated at the time the appliance is designed. The appliance can be designed to fill the pipe, or any portion of the connection assembly, such that the calibrated inner volume calibrates the amount of cleaning agent being injected into the mouthpiece by serving as a limit to the amount of cleaning agent that can be supplied from the supply tank prior to injection of the cleaning agent from the connection assembly. Notably, a user of the oral care appliance can still control a total volume of cleaning agent injected during a brushing routine in that they can control the number of injections.

In specific embodiments of the present invention an oral care appliance is provided wherein the at least one supply tank can be configured to calibrate the amount of the cleaning agent being injected into the mouthpiece. This can be done by utilizing a calibrated reservoir or a sensor in the at least one supply tank. In specific embodiments, a user can be able to alter the pressure difference created between the supply tank and the connection assembly in order to adjust a calibrated volume of cleaning agent delivered to the connection assembly during an injection. In these embodiments, a calibrated volume of the connection assembly might not be filled during the first step of an injection such that the pressure difference, as adjusted by the user, sets the calibrated volume as opposed to the volume of the connection assembly as designed.

In specific embodiments of the present invention an oral care appliance is provided, wherein the pressure difference is created between the mouthpiece and at least one supply tank.

In specific embodiments of the present invention a calibrated amount of the cleaning agent is injected into the mouthpiece.

In specific embodiments of the present invention an oral care appliance is provided, wherein the propellant system comprises a second valve mechanism and at least a pump, wherein the pump is configured to generate a pressurized flow of the cleaning agent.

In specific embodiments of the present invention an oral care appliance is provided, wherein the propellant system is configured to propel the cleaning agent through at least a portion of the connection assembly.

The first valve mechanism and the second valve mechanism can further comprise electrically or mechanically operated valves.

In specific embodiments of the present invention an oral care appliance is provided, wherein a positive pressure is applied in the at least one supply tank for pushing the cleaning agent to the connection assembly.

In specific embodiments of the present invention an oral care appliance is provided, wherein a negative pressure is applied in the cavity for aspirating the cleaning agent to the connection assembly.

In specific embodiments of the present invention an oral care appliance is provided, wherein injection of the cleaning agent from the supply tank to the mouthpiece is carried out in cycles.

In specific embodiments of the present invention an oral care appliance is provided, wherein the mouthpiece comprises a flexible membrane configured to deform in response to pressure variations caused in the cavity.

In specific embodiments of the present invention a method for injecting a cleaning agent into a mouthpiece is provided. The method comprises receiving the cleaning agent from at least one supply tank to a connection assembly connected to the mouthpiece. The cleaning agent is received due to pressure difference between the at least one supply tank and the mouthpiece. The method also comprises propelling the cleaning agent through at least a portion of the connection assembly, thereby resulting in injection of the cleaning agent into the mouthpiece.

In specific embodiments of the present invention, a method of injecting a cleaning agent into a mouthpiece is provided, wherein the opening of a first valve mechanism allows the cleaning agent to be propelled in the at least one pipe of the connection assembly.

In specific embodiments of the present invention, the flow of the cleaning agent can be controlled by the first valve mechanism.

In specific embodiments of the present invention, the cleaning agent can be propelled into the mouthpiece by a propellant system comprising the second valve mechanism and at least a pump.

In specific embodiments of the present invention, the cleaning agent can be propelled into the mouthpiece from the connecting assembly by the at least one pump with the second valve mechanism in open position and the first valve mechanism in closed position.

In specific embodiments of the present invention, the cleaning agent can be aspirated to the at least one pipe of the connection assembly due to negative pressure in the mouthpiece.

In specific embodiments of the present invention, the cleaning agent can be pushed to the connection assembly by applying a positive pressure in the at least one supply tank.

In specific embodiments of the present invention, the components can be protected from degradation as the electrical components don't contact the cleaning agent or any fluid.

In specific embodiments of the present invention, more than one supply tank can be provided comprising the same or different cleaning agents.

The pump(s) disclosed herein can be one-way pumps, such as peristaltic pumps, or two-way pumps.

The cleaning agent disclosed herein can comprise a liquid, solid, powder, emulsion, gels, fluid, or a combination thereof.

In specific embodiments of the present invention, a method is provided in which the cleaning agent can be injected more than one time during a brushing cycle.

In specific embodiments of the present invention, methods for injecting the cleaning agent/cleaning agent composition can be used to inject the cleaning agent/cleaning agent composition in more than one mouthpiece.

In specific embodiments of the present invention an oral care appliance is provided in which the cleaning agent can be injected into more than one mouthpiece.

In specific embodiments of the present invention, the volume injected in the mouthpiece is adjusted per injection.

In specific embodiments of the present invention, an oral care appliance is provided in which the electrical components are enclosed by a film or membrane to protect them from any fluid/liquid.

In specific embodiments of the present invention, various disclosed steps are partially or completely automated using one or more of: a control system, a timer, a pressure sensor and software. In specific embodiments of the invention, the oral care injection appliance utilizes a control system and/or other components for regulating the amount or volume of the cleaning agent injected during a brushing cycle.

DETAILED DESCRIPTION OF THE INVENTION

Aspects of the present invention can be understood by reference to the figures and description set forth herein. However, the following descriptions, and numerous specific details thereof, are given by way of illustration and not of limitation. Many changes and modifications to the specific descriptions may be made without departing from the spirit and scope thereof, and the present invention includes all such modifications. It is to be understood that the embodiments may or may not overlap with each other. Thus, part of one embodiment, or specific embodiments thereof, may or may not fall within the ambit of another, or specific embodiments thereof, and vice versa.

This disclosure is generally drawn, inter alia, to appliances, systems, and methods to maintain oral care health and hygiene.

Figure 1:
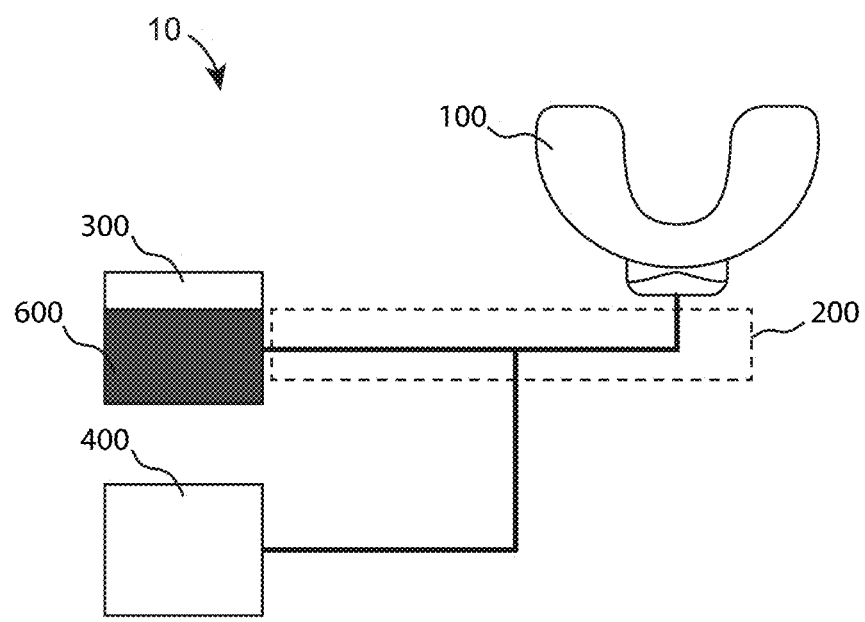
FIG. 1 illustrates an oral care appliance 10 in accordance with specific embodiments of the present invention.

FIG. 1 illustrates an oral care appliance 10. The appliance 10 comprises a mouthpiece 100 configured to form a cavity when applied on a dental arch of a user, a connection assembly 200 to supply a cleaning agent 600 to the mouthpiece 100 from at least one supply tank 300, wherein the cleaning agent 600 is received into the connection assembly 200 from the at least one supply tank 300 due to a pressure difference between the mouthpiece 100 and the at least one supply tank 300. The oral care appliance 10 further comprises a propellant system 400 configured to propel the cleaning agent 600 through the connection assembly 200, thereby resulting in injection of the cleaning agent 600 into the mouthpiece 100.

In specific embodiment, the cleaning agent referred to herein could be: a polishing agent such as an inert abrasive; a cleaning agent such as fluoride, activated charcoal, or a fluoride-fee antibacterial composition; a halitosis treatment agent such as chlorine dioxide; or a whitening agent such as hydrogen peroxide. The cleaning agent could also be any mixture of these kinds of agents and chemicals.

Figure 2:
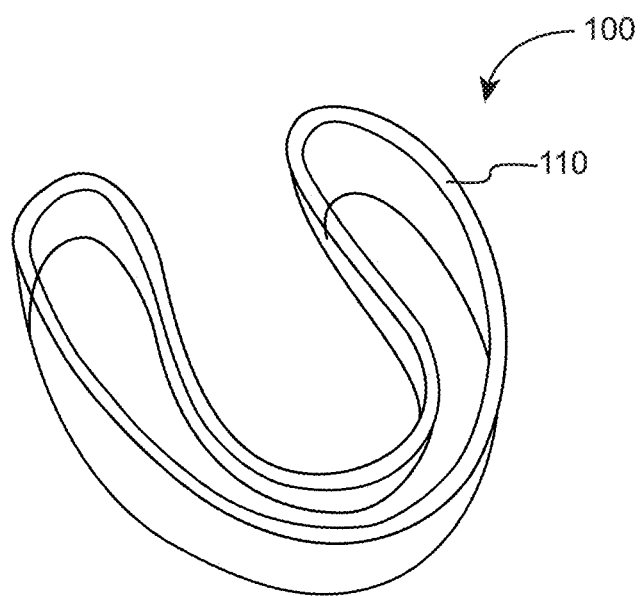
FIG. 2 illustrates a perspective view of a mouthpiece 100 in accordance with specific embodiments of the present invention.

The cavity can be a closed or nearly closed space formed between the mouthpiece 100 and the dental arch of the user. According to a specific embodiment of the present invention, the mouthpiece 100, as illustrated in FIG. 2, comprises a flexible membrane 110 configured to deform in response to pressure variations caused in the cavity resulting in volume changes of the cavity. The volume of the cavity can increase or decrease depending on the pressure variations inside the cavity. A positive pressure inside the cavity increases its volume and a negative pressure inside the cavity decreases its volume.

In specific embodiments of the present invention, the pressure variation generated in the cavity results in receiving the cleaning agent 600 from the at least one supply tank 300 to the connection assembly 200. For example, one way to create the pressure difference between the mouthpiece 100 and the at least one supply tank 300 is to apply a positive pressure in at least one supply tank 300 to push the cleaning agent 600 into the connection assembly 200. Another way to create the pressure difference is to create a negative pressure inside the mouthpiece 100, thereby pulling/aspirating the cleaning agent 600 into the connection assembly 200.

In specific embodiments of the present invention, the pressure difference inside the mouthpiece 100 can be created by using a pump or a depression chamber/reservoir which is, at least temporarily, in fluid communication with the cavity. A pump can transform electrical energy into mechanical work used to move fluid.

The mouthpiece 100 is preferably made up of flexible/soft material suitable for medical use or oral care. This allows easy insertion inside the mouth of the user providing comfort and reversible deformation. The mouthpiece 100 according to an embodiment of the invention can be made up of flexible material impermeable to gases (such as air), liquids (water, cleaning liquid, disinfecting liquid) and any solid (waste particles, debris); such as latex or silicone compatible with a medical or oral care use. The deformation of the flexible membrane 110 changes the gripping pressure of the mouthpiece 100 placed on the dental arch of the user.

Figure 3:
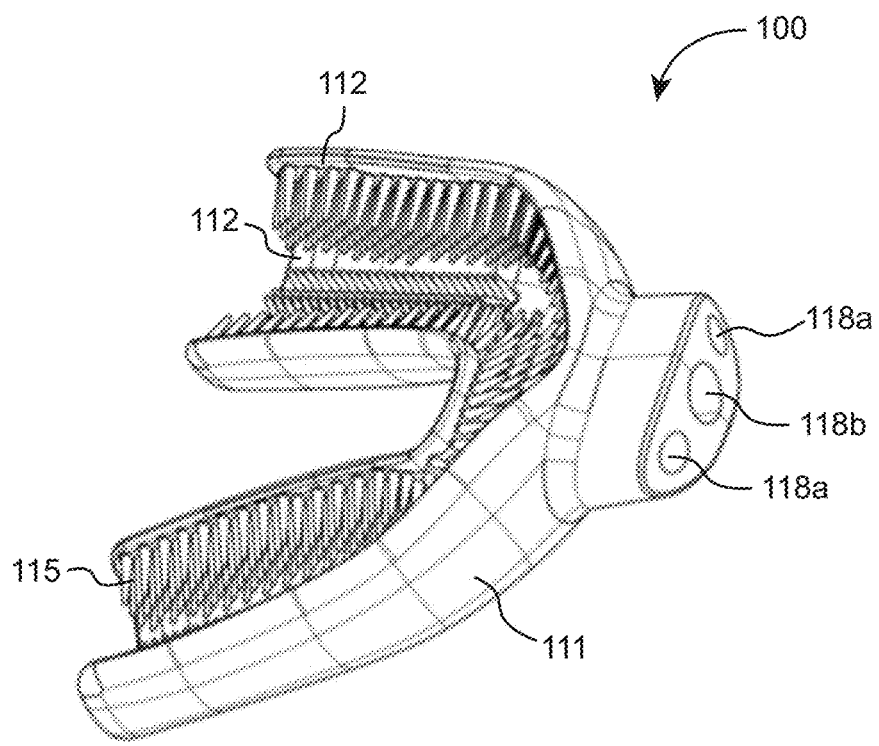
FIG. 3 illustrates a perspective view of the mouthpiece 100 in accordance with specific embodiments of the present invention.

In another embodiment of the invention as shown in FIG. 3, the mouthpiece 100 comprises an outer membrane 111 and an inner membrane 112. The outer membrane 111 and the inner membrane 112 can be made up of similar or different materials compatible to be used in oral care. The mouthpiece 100 further comprises of a plurality of holes 118a, 118b for injecting/draining of a fluid/cleaning agent into/from the mouthpiece 100. In particular examples, the at least one-hole 118a can be used for injecting the fluid inside the mouthpiece 100 and the at least one-hole 118b for draining the fluid out of the mouthpiece 100. In some further particular examples, the plurality of holes 118 can be placed on any position in the mouthpiece 100 according to a person skilled in the art. In a different example, a single hole 118 can be used for injecting/draining the fluid/cleaning agent. In another example of the invention, the injection hole 118a is placed in close proximity to the draining hole 118b. The purpose of doing so is to aspirate the exceeding amount of the cleaning agent 600 in the mouthpiece 100 so that the exceeding amount can be immediately drained out of the mouthpiece 100 through the draining hole 118b. Otherwise, an exceeding amount of cleaning agent 600 can be injected and overflow the mouthpiece and this could prove uncomfortable for the user.

In specific embodiments of the present invention, a plurality of cleaning elements 115 are attached to the inner membrane 112. The cleaning elements 115 can include a set of cylindrical or conical bristles which may be glued, overmolded or attached to the inner membrane by other different means. In specific examples, the shape of the cleaning elements 115 can be conical, cylindrical, flat, pointed tip, tapered, star-shaped, Zig-Zag etc. The cleaning elements 115 can be arranged in different angular arrangements in the mouthpiece 100 to provide effective cleaning around and in between the dental arch. The cleaning elements 115 can be used for removing plaque, debris, interdental particles, tartar, biofilm etc. thanks to a particular mechanical action on the teeth. The mechanical action of the cleaning elements 115 can consist of rubbing, sliding, deforming, rotating, vibrating or any other particular movement on the surface of the teeth of the user. The outer membrane 111 is configured for contacting the gum of the user, providing comfort and good hermeticity to the cavity formed by the mouthpiece 100.

The mouthpiece 100 can be in a form of a soft mouthpiece or a U-shaped mouthpiece. The mouthpiece 100 may be made-up of soft material which is molded/pre-shaped in a curved shape forming an arch, U-shape, c-shape, horse shoe shape, or any other shape allowing easy insertion of the mouthpiece 100 around the dental arch of the user. The components of the mouthpiece 100 can be composed of one or more several materials. Examples of materials may include but not limited to, rubber, plastic, silicon, latex, polymer and other soft and flexible material suitable for oral care.

The shape of the mouthpiece 100 may be adapted for adjustment of the mouthpiece 100 to match the height of gingiva and teeth of the user as well as the injection volume. The adaptability of the mouthpiece 100 according to different shapes and heights provides satisfactory dental cleaning to different users with different configurations of the dental arch.

Figure 4:
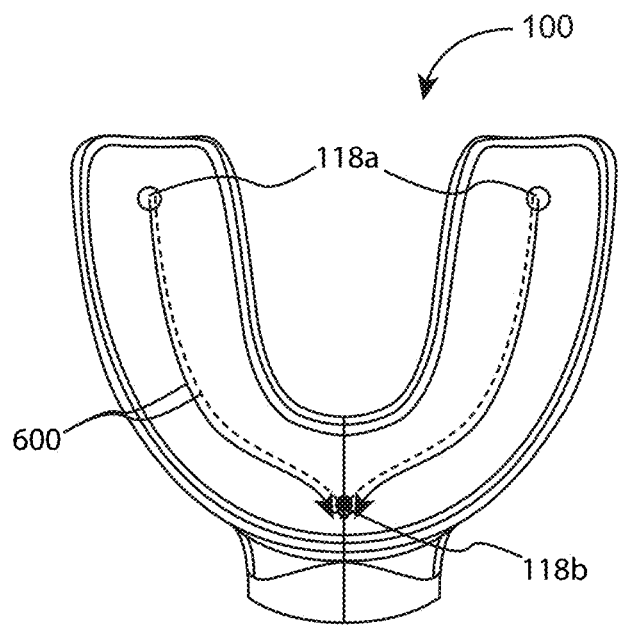
FIG. 4 illustrates an alternate arrangement of a plurality of holes 118a, 118b in the mouthpiece 100 in accordance with specific embodiments of the present invention.

FIG. 4 shows an alternative arrangement of the plurality of holes 118*a*, 118*b* in the mouthpiece 100. The plurality of injecting holes 118*a* are arranged at the end of the wings of the mouthpiece 100 and the plurality of draining holes 118*b* are arranged at the center or middle region of the mouthpiece 100. The cleaning agent 600 is injected into the mouthpiece 100 through the injecting holes 118*a*, further filling the cavity formed by the mouthpiece 100 and the dental arch. This arrangement of holes 118 increases the amount or volume of the cleaning agent 600 injected into the mouthpiece 100. Multiple alternative arrangements of the injecting holes 118*a* and the draining holes 118*b* are possible.

Figure 5:
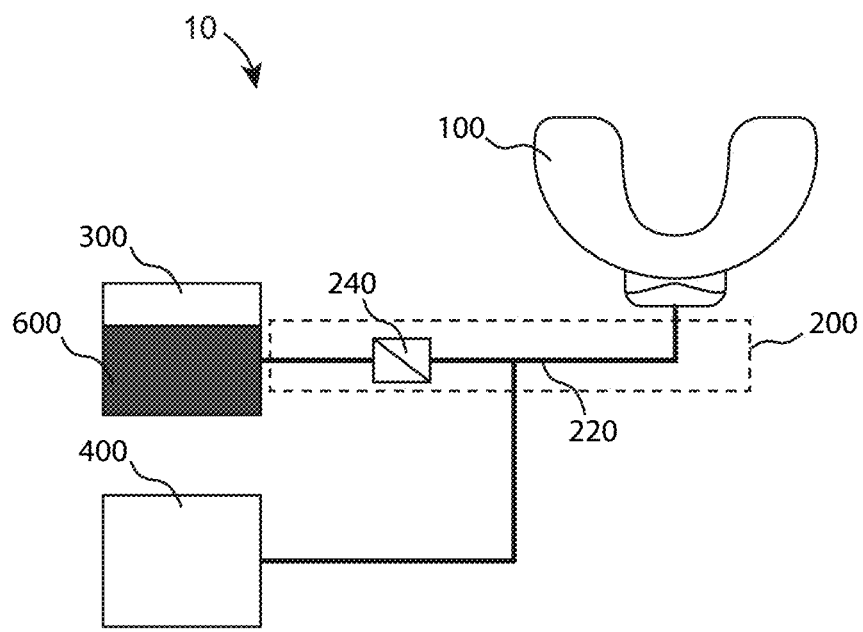
FIG. 5. illustrates a connection assembly 200 connecting the mouthpiece 100 to at least one supply tank 300 in accordance with specific embodiments of the present invention.

FIG. 5 shows the connection assembly 200 connecting the mouthpiece 100 to the at least one supply tank 300, thereby supplying the cleaning agent 600 to the mouthpiece 100. The connection assembly 200 comprises at least one pipe 220 and a first valve mechanism 240. The first valve mechanism 240 is arranged between the at least one supply tank 300 and the mouthpiece 100. When the pressure difference is created between the mouthpiece 100 and the at least one supply tank 300, the first valve mechanism 240 can be opened to receive the cleaning agent 600 inside the at least one pipe 220.

The amount of cleaning agent 600 injected into mouthpiece 100 can be a calibrated amount or volume for conducting the cleaning action in the mouthpiece 100. Specific embodiments disclosed below calibrate this calibrated amount or volume independently of the size of mouthpiece 100. As such, the calibrated amount is regulated irrespective of the user's physical characteristics and behavior. The volume of the cleaning agent 600 can be calibrated with the help of a calibrated volume of the connection assembly 200. For example, an inner volume of the at least one pipe 220 can be set to calibrate the volume of the cleaning agent 600 being injected into the mouthpiece 100. As such, the inner volume can be referred to as a calibrated volume. In a specific embodiment of the invention, the at least one pipe 220 is 90 cm long and 3 mm in diameter thus giving a calibrated volume of 6.36 mL. In another embodiment, the at least one pipe 220 is 90 cm long and 1.7 mm of diameter thus, the calibrated volume is 2 mL. In yet another embodiment, the at least one pipe 220 is 110 cm long and 3 mm of diameter thus giving a 7.8 mL calibrated volume. The calibrated volume can generally be in the range of 1 ml to 15 ml depending on a variety of factors such as the characteristics of the cleaning agent, the mouthpiece, and the propellant system. The pipe, or other connection assembly element can have a length set in part by user experience requirements and the strength of the propellant system. The diameter of the pipe or other connection assembly can then be set, based on the calibrated volume and length of the pipe. In another specific embodiment, the calibration of the cleaning agent 600 volume to be injected is regulated by monitoring the pressure loss in the connecting assembly 200. For instance, a small and adaptable air aperture placed on the pipe 220 (and equipped with a check valve to prevent liquid from leaking out of the pipe 220) can both create a mix of air and cleaning agent 600 inside the pipe 220 thus allowing the injection of a smaller amount of cleaning agent 600 or either limit the vacuum level in the pipe 220 meaning that the volume of cleaning agent 600 injected is smaller. Furthermore, having an adaptable aperture allow the modification of the calibrated volume of injected cleaning agent 600. In specific embodiments, the diameter of the pipe or other connection assembly can be variable to afford more flexibility to these parameters.

The calibrated volume can be a volume of the connection assembly that fills up in response to the pressure difference generated between the supply tank and the connection assembly. For example, the connection assembly and supply tank can be configured such that the transfer of cleaning agent to the connection assembly from the supply tank generates a countervailing pressure in the supply tank at the same time the above-mentioned pressure difference is minimized. These pressure differences will then either equalize or return to zero when the calibrated amount or volume of the cleaning agent has been transferred from the supply tank to the connection assembly.

In specific embodiments of the invention, the at least one supply tank 300 can be configured to calibrate the amount of the cleaning agent 600 being injected into the mouthpiece 100. This can be done by utilizing a calibrated reservoir or a sensor in the at least one supply tank 300. A membrane can be incorporated into the supply tank 300 where positive pressure put on the membrane calibrates the amount or volume of the cleaning agent 600 inside the supply tank 300, and thereby calibrates the amount or volume of the cleaning agent 600 transferred into the connection assembly. The membrane can separate a pressurized volume of air, with a calibrated pressure, from the cleaning agent inside the supply tank 300. For instance, when the top of the supply tank 300 is inflated with a fluid, the flexible membrane deforms and transfers the overpressure to the cleaning agent 600 thus pushing it into the connection assembly 200. By monitoring the overpressure applied in the supply tank 300 it is possible to know how much cleaning agent 600 is injected. However, this measure should take into account the level of cleaning agent 600 remaining in the supply tank 300.

In specific embodiments of the invention, the amount or volume of the cleaning agent 600 injected can also be calibrated and controlled by a timer in association with other parts of the oral care appliance 10 or the connection assembly 200. A control system of the oral care appliance can be programmed to calibrate and control the amount or volume of the cleaning agent. For example, if the flowrate of cleaning agent propelled or naturally flowing from the supply tank 300 is steady it is possible to have a valve mechanism operatively engaged to the supply tank 300. This valve mechanism is activated during a specific period of time thus allowing the injection of a calibrated amount of cleaning agent 600. The specific period of time is monitored by a timer or any other mean and should take into account the level of remaining cleaning agent 600 in the supply tank 300.

In specific embodiments of the invention, the amount or volume of the cleaning agent 600 can be actively controlled by a dosing pump or any other actuating means. This dosing pump can be a diaphragm pump, a piston pump, a peristaltic pump or any other precise pumping mean.

In specific embodiments of the invention, the amount or volume of the cleaning agent 600 can be regulated by sensors and software associated with the oral care appliance 10. The data from the sensors can be processed by a control system of the oral care appliance and the software can be instantiated by a processor of the control system. The sensors can be located at various locations in the oral care appliance 10 such as in the connection assembly 200, at an inlet or outlet to the connection assembly, in suply tank 300, or downstream from mouthpiece 100. In a specific example an optic sensor is integrated at the outlet of the supply tank 300 and is used to measure the amount of cleaning agent flowing through a translucent or transparent pipe. Knowing the cross-section area of the pipe and the flowrate of the flowing cleaning agent 600, a dedicated software is driving the status change (open/close) of a solenoid valve that is also integrated at the output of the supply tank 300. This action is based on the determined amount of cleaning agent 600 to propel to the mouthpiece 100. In another embodiment, the flow sensor can be a Pitot tube, a differential pressure-based flow meter, a volumetric based flow meter, turbine based flow meter, a velocity measurement based flow meter or any other mean designed to measure the flowrate of the fluid entering the mouthpiece 100 known to a person skilled in the art.

In specific embodiments of the invention, the connection assembly 200 can include one or more pipes and one or more valve mechanisms arranged therein, in a plurality of variations according to the requirements of the appliances and methods disclosed below.

Figure 6A:
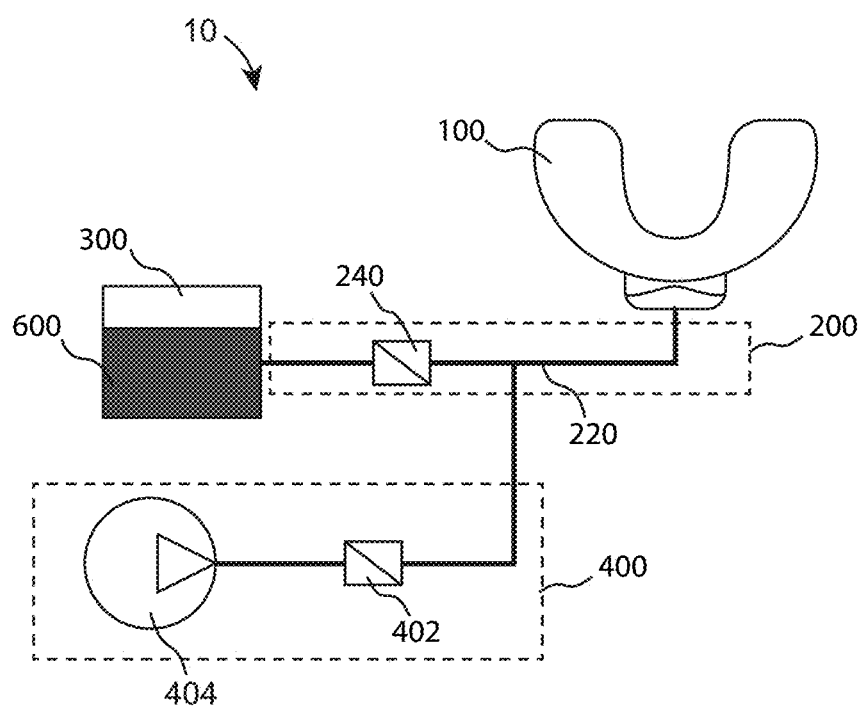
FIG. 6A illustrates a propellant system 400 operatively engaged to the connection assembly 200 in accordance with specific embodiments of the present invention.
Figure 6B:
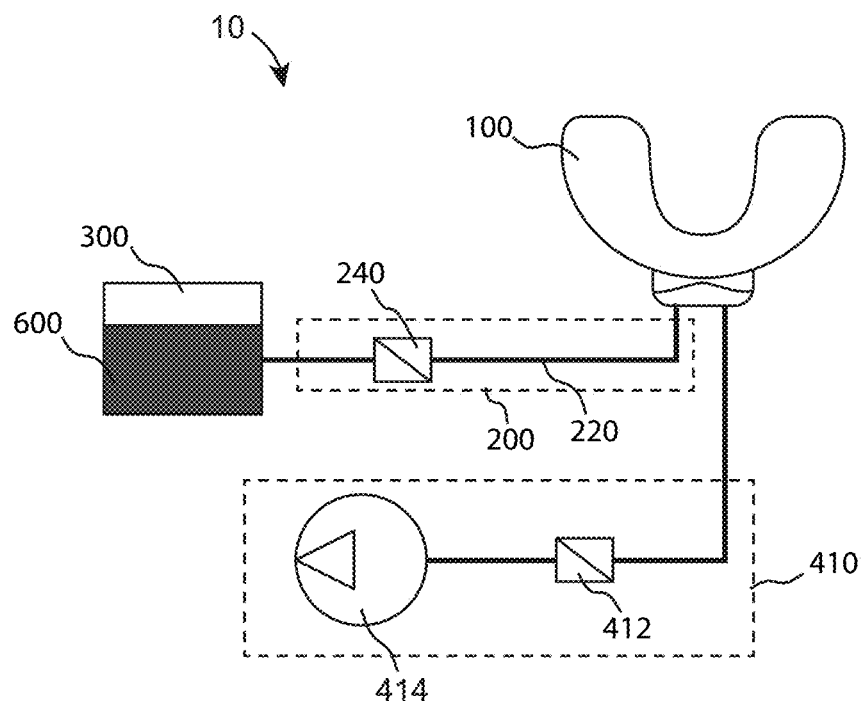
FIG. 6B illustrates a propellant system 410 operatively engaged directly to the mouthpiece 100 in accordance with specific embodiments of the present invention.

In specific embodiments of the invention, the oral care appliance 10 further comprises a propellant system 400 configured to propel the cleaning agent 600 through at least a portion of the connection assembly 200, thereby resulting in injection of the cleaning agent 600 into the mouthpiece 100. The injection of the cleaning agent 600 can be achieved by the push or pull operation of the propellant system 400. FIG. 6A illustrates the propellant system 400 comprising a second valve mechanism 402 and at least one pump 404. The at least one pump 404 is configured to generate a pressurized flow of the cleaning agent 600 through at least a portion of the connection assembly 200 (for example, the at least one pipe 220). This step occurs after the aspiration of the cleaning agent 600 inside the connection assembly 200 generated by a pressure variation between the mouthpiece 100 and the supply tank 300 (the means for generating such a pressure difference is not shown). For a push operation, the propellant system 400 is operatively engaged to the connection assembly 200 as shown in FIG. 6A. For a pull operation, the propellant system 410 is operatively engaged directly to mouthpiece 100 as shown in FIG. 6B. The propellant system 410 comprises a third valve mechanism 412 and at least a pump 414. The propellant system 410 creates a negative pressure inside the mouthpiece 100 by opening the valve mechanism 412, thereby pulling or aspirating the cleaning agent 600 into the mouthpiece 100. The valve mechanism 412 is closed when the cleaning agent 600 is injected into the mouthpiece 100.

In specific embodiments of the invention, the propellant means 410 comprises a reservoir connected with a pump and a valve. In different specific example, the propellant system 410 also creates the negative pressure inside the cavity.

In specific embodiments of the invention, valve mechanisms such as valve mechanisms 240, 402, and 412, comprise electrically or mechanically operated valves. Additionally, the valve mechanisms can be solenoid valves servo-valves, or any electronic valves with a pinch valve or a membrane valve. The valve mechanisms may also be replaced by a valve which is controlled by a pneumatic circuit (i.e., a pneumatic control valve).

In specific embodiments of the invention, the valve mechanisms can be open or closed for a set time defined by a timer, or by software, or by a pressure sensor. The oral care appliance can include a control system programmed to control the state of the valves and switch them between open or closed states in order to inject the cleaning agent into the connection assembly and subsequently propel it from the connection assembly to the mouthpiece. In a specific example, the set time can be set and controlled depending on the requirements of a brushing cycle using the appliance. In another example, the aperture of the valve mechanism is activated when a specific pressure value is reached inside the mouth of the user. This operating allows to have a steady control of the cleaning agent 600 injected during the brushing cycle. During a single use of the oral care appliance, multiple brushing cycles may be conducted, and a calibrated volume of cleaning agent could be transferred from the supply tank to the mouthpiece in each cycle.

In specific embodiments of the invention, the cleaning agent 600 can be selected from the group of, but not limited to, liquid, solid, powder, emulsion, gels, fluid, or a combination thereof. The cleaning agent 600 can be supplied to the mouthpiece 100 by creating a pressure difference between the mouthpiece 100 and the at least one supply tank 300. In the case of a cleaning agent in the form of a powder, it is mixed with a diluting liquid thanks to a dedicated mixing system such as a venturi assembly, a mixing chamber or any other mixing mean. The mixed solution is then injected as an homogenous fluid with a pressure difference between the mouthpiece 100 and the supply tank(s) 300. In the case of a cleaning agent in the form of a gel, the cleaning agent might also be injected thanks to a pressure difference between the mouthpiece 100 and the supply tank 300. However, if the viscosity of the gel is too high this solution would take too much time. If so, the solution could be integrated inside a handle close to the mouthpiece 100 to reduce the injection duration, diluted in a diluting solution and then injected as a liquid solution or injected with a higher pressure thanks to a worm screw, a piston, a peristaltic pump or any other dedicated distributor.

In specific embodiments of the invention, the oral care appliance 10 comprises a plurality of supply tanks 300 which can be arranged in parallel, in series, or a combination thereof. In a specific example, the plurality of supply tanks 300 are configured to calibrate the amount/volume going through therein and the plurality of supply tanks 300 can comprise of same or different cleaning agents.

Figure 7:
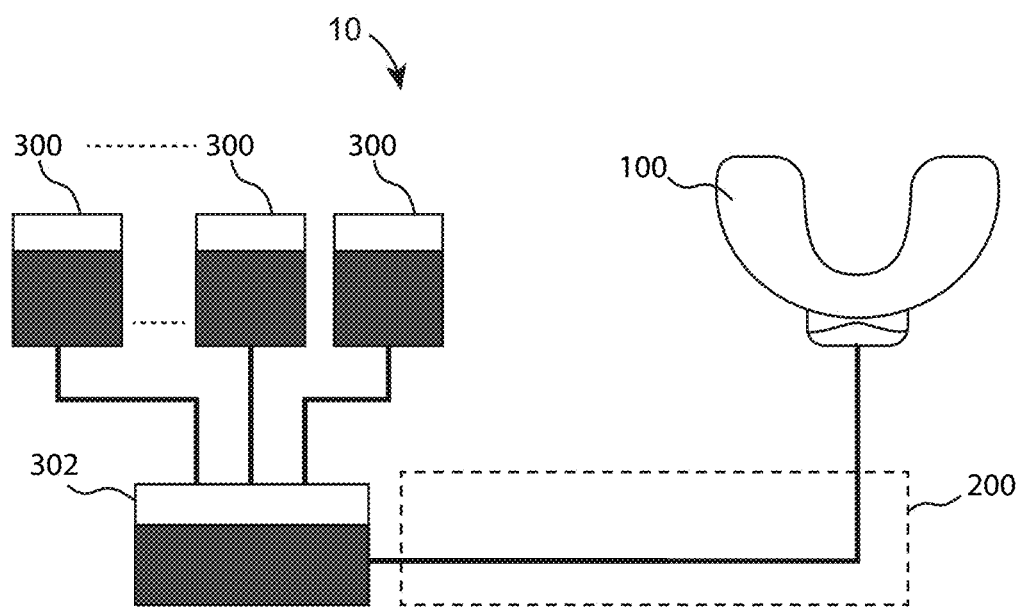
FIG. 7 illustrates an intermediary supply tank 302 connected to the plurality of supply tanks 300 in accordance with specific embodiments of the present invention.

According to specific embodiments of the invention in accordance with FIG. 7, the plurality of supply tanks 300 can be connected to an intermediary supply tank 302 that provides the cleaning agent composition for injection into the mouthpiece 100. The intermediary supply tank 302 can be arranged to pre-calibrate the volume of the cleaning agent to be applied in a given injection or brushing cycle.

In specific embodiments of the invention, one of the supply tanks 300 can also be arranged to act as an intermediary supply tank that is connected to the other supply tanks to form a cleaning agent composition for injection into the mouthpiece 100. In an alternate version of this example, the intermediary supply tank can be arranged to pre-calibrate the volume of the cleaning agent. To achieve calibration, the intermediary supply tank can include a calibrated reservoir to be filled by the cleaning agent before the cleaning agent reaches the mouthpiece 100, and then emptied to fill the mouthpiece 100. The intermediary supply tank can also include a sensor to measure the amount/volume of the cleaning agent being injected from the upstream supply tank or tanks and being injected to the connection assembly.

In specific embodiments of the invention, the cleaning agent is directly dosed and injected with a pump or any other actuating means and without the use of a separate connection assembly.

In specific embodiments of the invention, the cleaning agent 600 may be directly applied on the teeth or inside the mouthpiece 100 by the user, wherein cleaning agent 600 may be selected from the group of, but not limited to a toothpaste, gel, powder, mouthwash, water, aqueous solution etc.

In specific embodiments of the invention, the oral care appliance 10 may comprise at least one sensor. The at least one sensor can be provided to measure the pressure, fluid flow, temperature, and other physical parameters inside the mouthpiece 100, the connection assembly 200, the supply tank 300 and other components of the oral care appliance 10. The sensor can be placed at any position in the oral care appliance according to its specific function.

In specific embodiments of the invention, the injection of the cleaning agent 600 from the supply tank 300 to the mouthpiece 100 is carried out in cycles. Each cycle is related to generation of pressure difference so there can be multiple cycles of pressure variations in the mouthpiece 100. The pressure sensors and pumps (or any other actuators) in the oral care appliance 10 help to create automatic cycles of pressure variations during its operation.

In specific embodiments of the invention, a brushing cycle comprises a sequence of injections of the cleaning agent 600 inside the mouthpiece 100 followed by contraction and relaxation phases. The cleaning agent 600 can be injected into the mouthpiece 100 by creating the pressure difference inside the mouthpiece 100. The pressure difference can be on negative side or positive side. The injection cycle is followed by a contraction cycle in which the waste is drained out from the mouthpiece 100 followed by a relaxation cycle in which ambient air is injected into the mouthpiece 100. The cleaning agent 600 can be injected more than one time during a brushing cycle. In other words, the injection of cleaning agent 600 from the at least one supply tank 300 to the mouthpiece 100 can be carried out in cycles.

In specific embodiments of the invention, a method of injecting a cleaning agent 600 into a mouthpiece 100 during a cycle of dental cleaning for oral hygiene is provided. The method comprises the steps of: receiving the cleaning agent 600 from at least one supply tank 300 to a connection assembly 200 connected to the mouthpiece 100, wherein the cleaning agent 600 is received due to pressure difference between the at least one supply tank 300 and the mouthpiece 100; propelling the cleaning agent 600 through at least a portion of the connection assembly 200, thereby injecting the cleaning agent 600 into the mouthpiece 100.

In specific embodiments of the invention, the cleaning agent 600 is received into the mouthpiece 100 by aspirating the cleaning agent 600 from the at least one supply tank 300 to a connection assembly 200, wherein the cleaning agent 600 is aspirated due to the negative pressure generated in the mouthpiece 100.

In specific embodiments of the present invention, the cleaning agent 600 is received into the mouthpiece 100 by pushing the cleaning agent 600 from the at least one supply tank 300 to the connection assembly 200, wherein the cleaning agent 600 is being pushed due to the positive pressure generated in the supply tank 300.

Figure 8A:
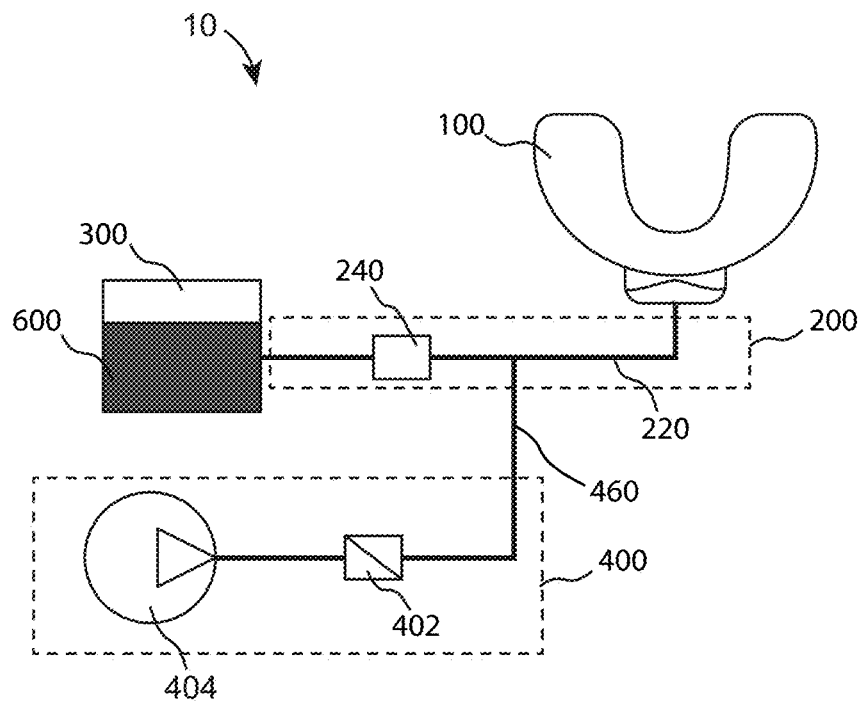
FIGS. 8A and 8B illustrates the method of injecting the cleaning agent 600 into the mouthpiece 100 in accordance with specific embodiments of the present invention.
Figure 8B:
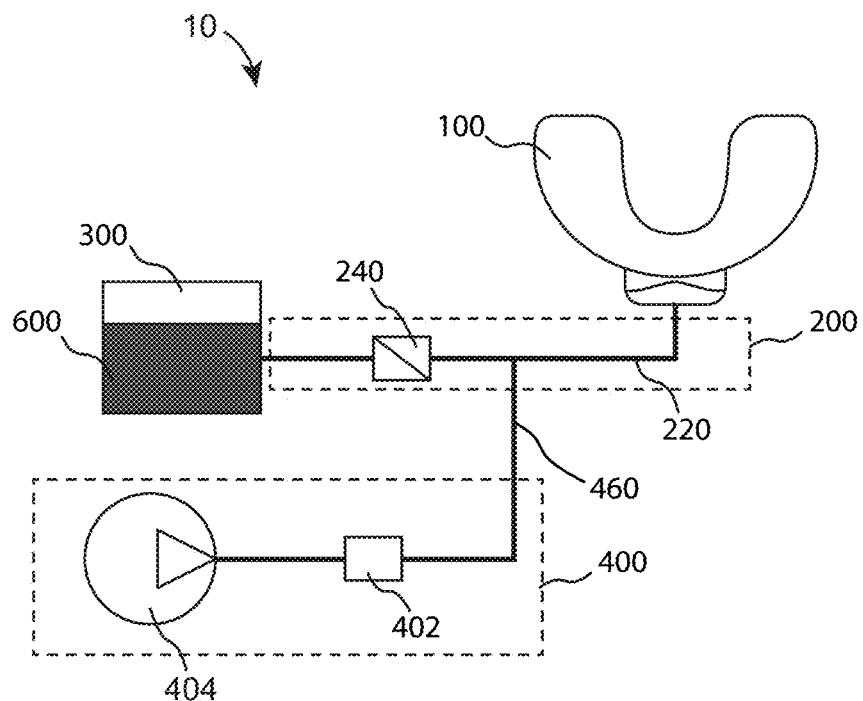

FIGS. 8A and 8B can be used to explain a method of injecting the cleaning agent 600 into the mouthpiece 100. As illustrated in FIG. 8A, the first valve mechanism 240 is opened for receiving the cleaning agent 600 from at least one supply tank 300 to the at least one pipe 220 connected to the mouthpiece 100. The first valve mechanism 240 is opened after creating the pressure difference between the mouthpiece 100 and the supply tank 300 via a pumping means. The first valve mechanism 240 is closed when the cleaning agent 600 is received in the pipe 220 due to the aforementioned pressure difference and the second valve mechanism 402 is opened as shown in FIG. 8B to propel the cleaning agent 600 through at least a portion of the pipe 220 by the pump 404, thereby resulting in injection of the cleaning agent 600 into the mouthpiece 100.

Figure 9A:
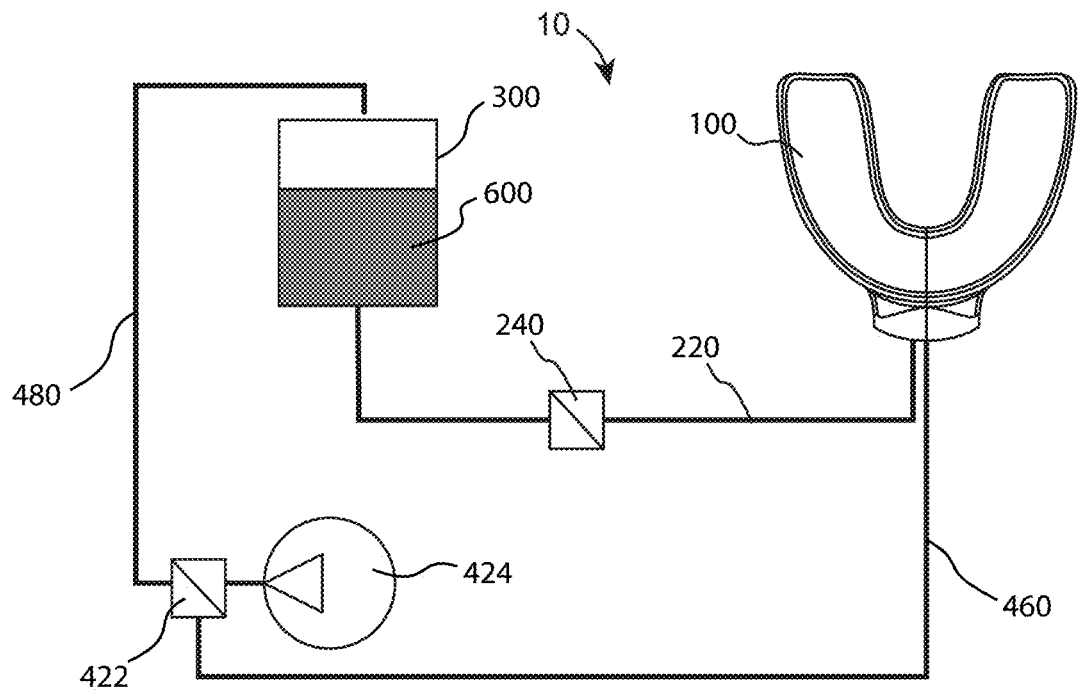
FIG. 9A illustrates the oral care appliance 10 in accordance with specific embodiments of the present invention.

FIG. 9A illustrates another configuration, which is in accordance with specific embodiments of the invention, wherein the oral care appliance 10 comprises a valve mechanism 422 and a pump 424 configured to make dual connection, one with the supply tank 300 and another with the mouthpiece 100. The pump 424 and the valve mechanism 422 is connected to the supply tank 300 with a connection line 480 and the pump 424 and the valve mechanism 422 is connected to the mouthpiece 100 with a connection line 460. In the illustrated embodiments, pipe 220 is provided as a connection assembly, but the approach illustrated by FIG. 9A is not limited to a pipe.

Figure 9B:
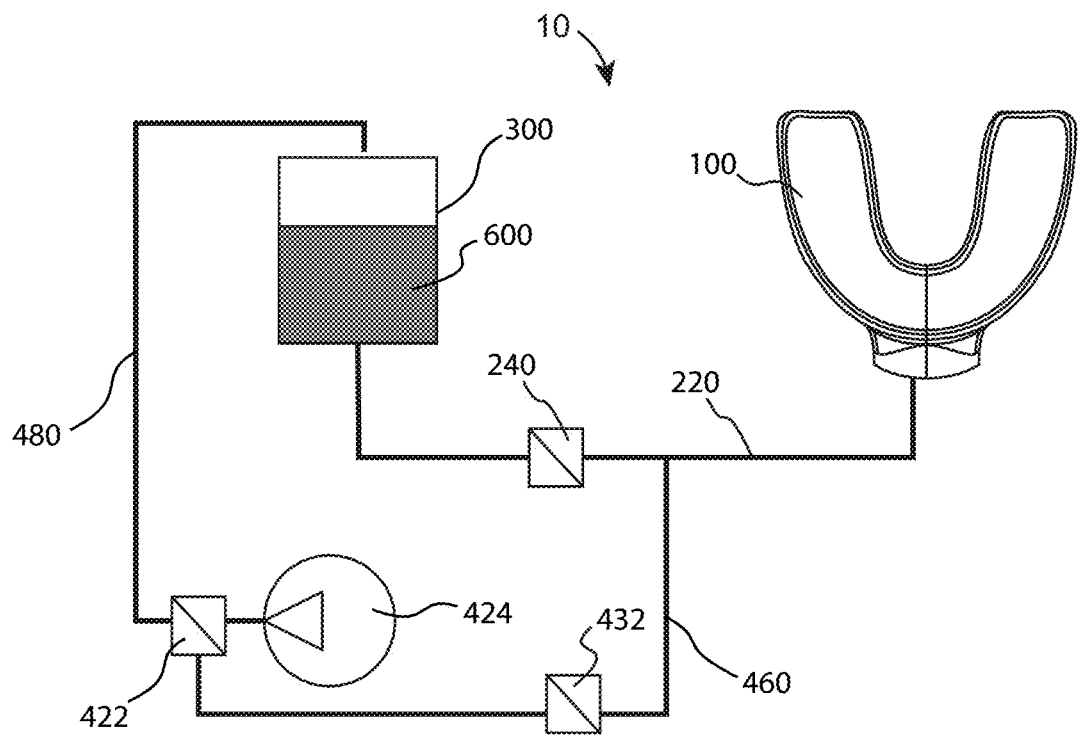
FIG. 9B illustrates the oral care appliance 10 in accordance with specific embodiments of the present invention.

FIG. 9B illustrates another configuration, which is accordance with specific embodiment of the invention, wherein the pump 424 is configured to make dual connection, one with the supply tank 300 and another with the pipe 220. The pump 424 and the valve mechanism 422 are connected to the supply tank 300 with the connection 480. The pump 424 and the valve mechanism 422 are connected to the pipe 220 with the connection line 460, wherein another valve mechanism 432 is placed in the connection line 460. In the illustrated embodiments, pipe 220 is provided as a connection assembly, but the approach illustrated by FIG. 9A is not limited to a pipe.

In FIG. 9A, the cleaning agent 600 is received into the pipe 220 through the supply tank 300 due to the positive pressure generated in the supply tank 300. This positive pressure is created when the valve mechanism 422 is in open position, thereby pumping the air provided by the pump 424 to the supply tank 300 through the connection line 480. At the same time, air is also being pumped through the connecting line 460 from the pump 424 to the mouthpiece 100 so as to create negative pressure in the mouthpiece 100 for accelerating and creating disturbance in the flow of the cleaning agent 600 into the mouthpiece 100. This injected cleaning agent 600 can reach the interproximal areas of the dental arch and provide maximum oral cleaning. The valve 240 is in open position to inject the cleaning agent 600 into the mouthpiece 100. Valve 422 can be closed prior to opening valve 240.

In FIG. 9B, the cleaning agent 600 is received into the pipe 220 through the supply tank 300 while valve mechanism 240 is in an open position due to the positive pressure generated in the supply tank 300. When a calibrated/sufficient amount of the cleaning agent 600 is received in the pipe 220 or a set timer is expired, the valve mechanism 240 is closed and the valve mechanism 432 is opened to allow the pump 424 to push/propel the cleaning agent 600 from the pipe 220 to the mouthpiece 100. The pump 424 creates a pressurized flow of the cleaning agent 600 through at least a portion of the pipe 220 by propelling the cleaning agent at a high speed.

The oral care appliances 10 as disclosed in FIG. 9A and FIG. 9B can comprise a plurality of supply tanks.

Figure 10:
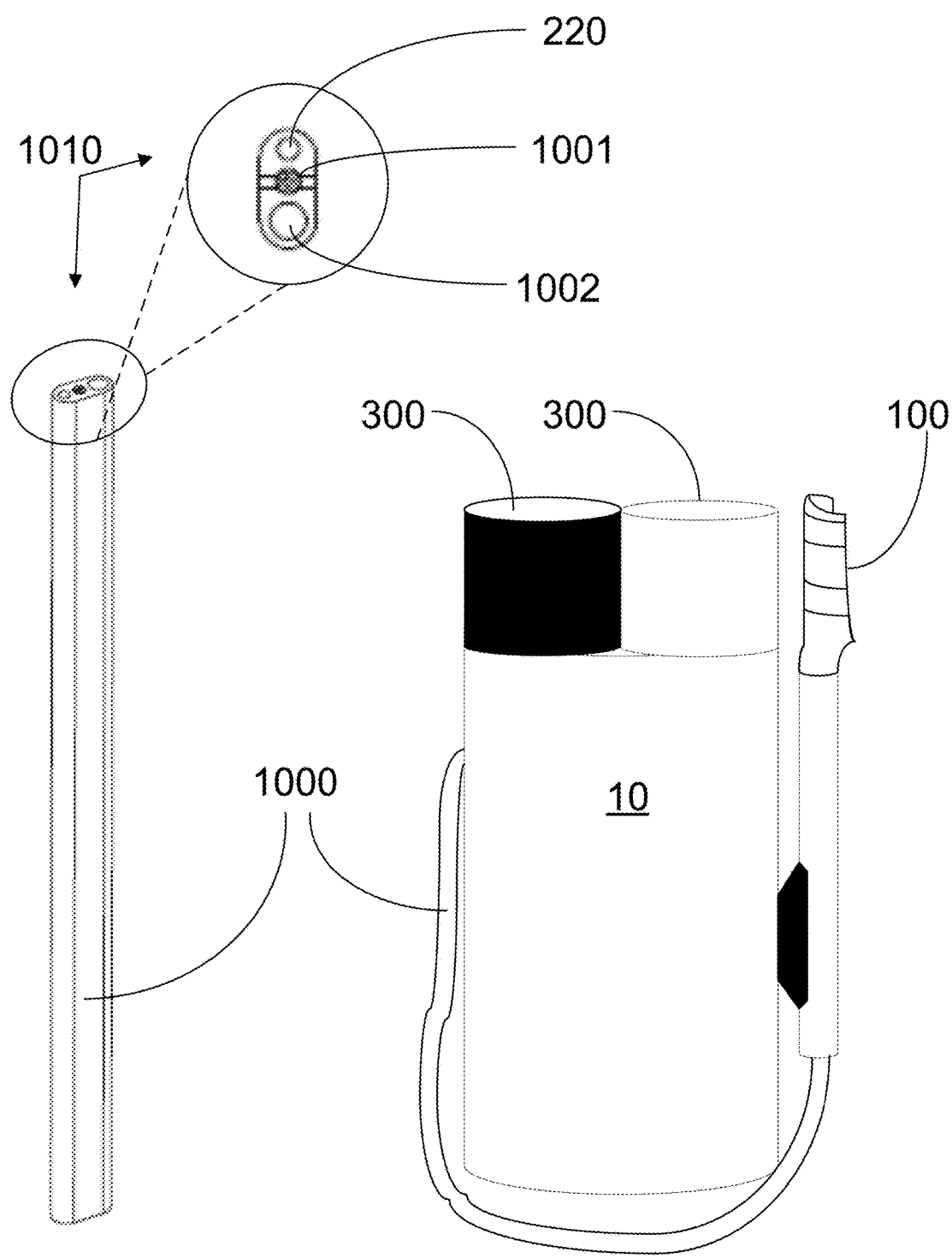
FIG. 10 illustrates an oral care appliance 10 with a pipe 220 connecting the mouthpiece 100 to at least one supply tank 300, and a cross section of pipe 220, in accordance with specific embodiments of the present invention.

FIG. 10 illustrates an oral care appliance 10 with a pipe 220 connecting the mouthpiece 100 to at least one supply tank 300, and a cross section of pipe 220, in accordance with specific embodiments of the present invention. In the illustrated embodiments, the two supply tanks 300 are connected to an intermediary supply tank 302 (shown in FIG. 7) internal to oral care appliance 10 and connected to pipe 220 via a valve internal to oral care appliance 10. As, illustrated pipe 220 is a single channel in a silicon tube 1000 shown in cross section 1010. Pipe 220 can be detached at the first valve mechanism internal to oral care appliance 10 and can include sockets configured to mate with the mouthpiece and first valve mechanism. Cross section 1010 of silicon tube 1000 shows three channels: pipe 220, wire routing channel 1001, and return pipe 1002. Pipe 220 has a diameter of 2 mm. Wire routing channel 1001 has a diameter of 2.2 mm and is designed to route 4 electrical wires between appliance 10 and the handle of mouthpiece 100. Return pipe 1002 has a diameter of 3.2 mm. Pipe 220 can be in fluid connection with holes such as 118a to deliver cleaning agent to mouth piece 100 and return pipe 1003 can be in fluid connection with holes such as 118b to remove waste from mouth piece 100. As such, the same physical tube can be the only connection between the mouthpiece 100 and the appliance 10. As mentioned, the diameter and length of pipe 220 can be set to calibrate the amount of cleaning agent provided to mouthpiece 100 during an injection. Accordingly, the requirements setting the length of return pipe 1002 may limit the dimensions available to set the inner volume of pipe 220. However, the diameter of pipe 220 can be adjusted independently of the length of return pipe 1002 to thereby independently set the calibrated volume of cleaning agent in embodiments where the inner volume of pipe 220 sets the calibrated volume.

In specific embodiments of the invention, the supply tank 300 provided in the oral care appliance 10 has a flexible membrane that deforms to push the components of the cleaning agent 600 when the pressure inside the supply tank 300 increases.

In specific embodiments of the invention, the supply tank 300 comprises a valve to control the fluid coming out of it. The supply tank 300 can be provided with various arrangements to check the fluid flow from it, known to the person skilled in the art. Check valves can also be utilized in association with the supply tank 300 or other components of the oral care appliance 10 to check or control the flow of the cleaning agent or the air.

In specific embodiments of the invention, the supply tank 300 can further be provided with pressure limiters to control the pressure inside the tank 300 and to regulate the flow of the components of the cleaning agent/cleaning agent composition therein.

In specific embodiments of the invention, the supply tank 300 is delivered under pressure to ensure a good and steady flow of the cleaning agent 600 when plugged to the oral care appliance.

In specific embodiments of the invention, the supply tank 300 comprises a plunger at its base to control the flow of the cleaning agent 600 coming out of it.

In specific embodiments of the invention, the aforementioned valve mechanisms can be opened or closed for a particular predefined time. The predefined time can be between 10-1000 ms.

In specific embodiments of the invention, the aforementioned valve mechanisms can be opened or closed when a certain pressure is reached in the components of the oral care appliance 10. The certain pressure can be between −50 kPa to 200 kPa. The time and pressure can vary depending upon the use and the requirements of the brushing cycle.

In specific embodiments of the invention, the aforementioned pumps can be one-way pumps whereby the flow can only be circulated in one direction while the pump is activated, or two-way pumps whereby a counterflow might appear while the pump is activated.

In specific embodiments of the invention, the liquid injection as disclosed in above mentioned method(s) can be repeated several times during the brushing cycle to increase the overall volume of the cleaning agent 600.

In specific embodiments of the invention, the method of the invention can be used to inject the cleaning agent/ cleaning agent composition in more than one mouthpiece. The cleaning agent can be injected in a sequential manner or simultaneously in more than one mouthpiece.

One or more of the above-mentioned embodiments/steps can be automated completely or partially using one or more of a control system, timer, pressure sensor and software.

Although the invention has been described with regard to its embodiments, specific embodiments and various examples, it should be understood that various changes and modifications as would be obvious to one having the ordinary skill in this art may be made without departing from the scope of the invention as set forth in the claims appended hereto.

What is claimed is:

1. An oral care appliance comprising:
   a mouthpiece;
   a supply tank with a cleaning agent;
   a connection assembly configured to supply the cleaning agent to the mouthpiece from the supply tank; and
   a propellant system comprising: a controller; a pump mechanism; and a valve mechanism;
   wherein the controller is configured to actuate the valve mechanism to: (i) build a pressure difference, using the pump mechanism, by closing the valve mechanism; and (ii) propel the cleaning agent through the connection assembly into the mouthpiece, using the pressure difference, by opening the valve mechanism.

2. The oral care appliance of claim 1, wherein the mouthpiece is configured to form a cavity between the mouthpiece and gums of a user.

3. The oral care appliance of claim 2, wherein the mouthpiece comprises a flexible membrane configured to deform in response to pressure variations caused in the cavity.

4. The oral care appliance of claim 1, characterized in that the connection assembly comprises:
   at least one pipe; and
   a first valve mechanism.

5. The oral care appliance of claim 4, wherein: an inner volume of the at least one pipe calibrates an amount of the cleaning agent being injected into the mouthpiece.

6. The oral care appliance of claim 1, wherein the supply tank is configured to calibrate an amount of the cleaning agent being injected into the mouthpiece.

7. The oral care appliance of claim 1, wherein the oral care appliance is configured to inject a calibrated volume of the cleaning agent into the mouthpiece.

8. The oral care appliance of claim 1, wherein the valve mechanism comprises one of: an electrically operated valve; and a mechanically operated valve.

9. The oral care appliance according to claim 1, wherein the pressure difference:
   is a positive pressure generated in the supply tank; and pushes the cleaning agent from the supply tank to the connection assembly.

10. The oral care appliance according to claim 1, wherein the pressure difference:
is a negative pressure generated in a cavity formed by the mouthpiece; and
aspirates the cleaning agent from the supply tank to the connection assembly.

11. The oral care appliance of claim 1, wherein the controller is programmed to inject the cleaning agent from the supply tank to the mouthpiece in cycles.

12. The oral care appliance of claim 1, wherein the cleaning agent is one of: a liquid, solid, fluid and a combination thereof.

13. The oral care appliance of claim 1, wherein the pump mechanism comprises a one-way pump.

14. The oral care appliance of claim 13, wherein: the one-way pump is a peristaltic pump.

15. The oral care appliance of claim 1, wherein the pump mechanism comprises a piston pump.

16. A method comprising:
receiving, into a connection assembly connected to a mouthpiece, a cleaning agent from at least one supply tank; and
injecting the cleaning agent into the mouthpiece using a propellant system;
wherein the propellant system comprises a controller, a pump mechanism, and a valve mechanism; and
wherein the injecting is conducted by the controller and includes: (i) closing the valve mechanism; (ii) building a pressure difference, using the pump mechanism, while the valve mechanism is closed; and (iii) opening the valve mechanism to propel the cleaning agent through the connection assembly into the mouthpiece using the pressure difference.

17. The method of claim 16, further comprising: controlling a flow of the cleaning agent with a valve mechanism of the connection assembly.

18. The method according to claim 16, further comprising:
aspirating the cleaning agent to the connection assembly using a negative pressure in the mouthpiece;
wherein the negative pressure is the pressure difference.

19. The method according to claim 16, further comprising:
pushing the cleaning agent to the connection assembly using a positive pressure applied in the supply tank;
wherein the positive pressure is the pressure difference.

20. The method according to claim 16, further comprising:
controlling an amount of the cleaning agent injected into the mouthpiece based on an inner volume of the connection assembly.

21. The method according to claim 16, characterized in that the cleaning agent comprises one of a liquid, solid, fluid and a combination thereof.

* * * * *